(12) United States Patent
Nakhamkin

(10) Patent No.: US 7,406,828 B1
(45) Date of Patent: Aug. 5, 2008

(54) POWER AUGMENTATION OF COMBUSTION TURBINES WITH COMPRESSED AIR ENERGY STORAGE AND ADDITIONAL EXPANDER WITH AIRFLOW EXTRACTION AND INJECTION THEREOF UPSTREAM OF COMBUSTORS

(76) Inventor: Michael Nakhamkin, 40 Woodman La., Basking Ridge, NJ (US) 07920

(*) Notice: Subject to any disclaimer, the term of this patent is extended or adjusted under 35 U.S.C. 154(b) by 0 days.

(21) Appl. No.: 12/076,689

(22) Filed: Mar. 21, 2008

Related U.S. Application Data

(62) Division of application No. 11/657,661, filed on Jan. 25, 2007.

(51) Int. Cl.
*F02C 6/16* (2006.01)
*F02C 6/18* (2006.01)

(52) U.S. Cl. .................. 60/772; 60/39.183; 60/727

(58) Field of Classification Search .......... 60/39.181, 60/39.183, 726, 727, 728, 772
See application file for complete search history.

(56) References Cited

U.S. PATENT DOCUMENTS

| | | | |
|---|---|---|---|
| 3,631,673 | A | 1/1972 | Charrier et al. |
| 4,885,912 | A | 12/1989 | Nakhamkin |
| 5,632,143 | A | 5/1997 | Fisher et al. |
| 5,934,063 | A | 8/1999 | Nakhamkin |
| 6,305,158 | B1 | 10/2001 | Nakhamkin |
| 6,745,569 | B2 | 6/2004 | Gerdes |

FOREIGN PATENT DOCUMENTS

| | | |
|---|---|---|
| DE | 102004040890 A1 | 3/2005 |
| RU | 2029119 C1 | 2/1995 |
| SU | 383859 A | 8/1973 |
| WO | WO 92/22741 A1 | 12/1992 |

*Primary Examiner*—Louis J Casaregola
(74) *Attorney, Agent, or Firm*—Manelli Denison & Selter PLLC; Edward J. Stemberger

(57) ABSTRACT

A combustion turbine power generation system (10) includes a combustion turbine assembly (11) including a main compressor (12) constructed and arranged to receive ambient inlet air, a main expansion turbine (14) operatively associated with the main compressor, combustors (16) constructed and arranged to receive compressed air from the main compressor and to feed the main expansion turbine, and an electric generator (15) associated with the main expansion turbine for generating electric power. A compressed air storage (18) stores compressed air. A heat exchanger (24) is constructed and arranged to receive a source of heat and to receive compressed air from the storage so as to heat compressed air received from the storage. An air expander (28) is associated with the heat exchanger and is constructed and arranged to expand the heated compressed air for producing additional electric power. Airflow, extracted from the expander, is injected into the combustion turbine assembly upstream of the combustors for combustion turbine assembly power augmentation.

13 Claims, 2 Drawing Sheets

POWER AUGMENTATION OF COMBUSTION TURBINES WITH COMPRESSED AIR ENERGY STORAGE AND ADDITIONAL EXPANDER WITH AIRFLOW EXTRACTION AND INJECTION THEREOF UPSTREAM OF COMBUSTORS

This application is a division of U.S. application Ser. No. 11/657,661, filed on Jan. 25, 2007.

FIELD OF THE INVENTION

This invention relates to power augmentation of combustion turbine power systems with compressed air energy storage and additional expander; and, more particularly, to augmenting power of the system by expanding heated, high pressure compressed air from a storage for producing additional expander power and extracting airflow from the expander and injecting the extracted airflow into the combustion turbine upstream of combustors for combustion turbine power augmentation.

BACKGROUND OF THE INVENTION

It is well known that combustion turbines have significant power degradation associated with increased ambient temperature or high elevations. This loss of power is primarily associated with the reduced mass of the combustion turbine's airflow, caused by the reduced inlet air density.

There are a number of power augmentation technologies targeting the recovery of the power lost by combustion turbines due to high ambient temperatures/high elevation:

- The Air Injection power augmentation technology that is based on the injection upstream of combustors of additional airflow (humid or dry) that is delivered by external auxiliary compressor(s);
- Inlet chillers that cool the ambient air and provide a corresponding power augmentation;
- Evaporative coolers, inlet fogging and "wet compression" technologies that provide power augmentation by a combination of the inlet air cooling and the increased mass flow through the combustion turbine;
- Air Injection power augmentation technology disclosed in my earlier U.S. Pat. No. 5,934,063, the contents of which is incorporated by reference herein, that is based upon air injection upstream of combustors using a compressed air energy storage. However, the compressed air in the storage typically has a much higher pressure than is needed for the air injection for the power augmentation.

Thus, there is a need to utilize the compressed air storage high pressure to further improve the incremental power and to improve the overall heat rate of the system.

SUMMARY OF THE INVENTION

An object of the invention is to fulfill the need referred to above. In accordance with the principles of the present invention, this objective is achieved by providing a combustion turbine power generation system including a combustion turbine assembly including a main compressor constructed and arranged to receive ambient inlet air, a main expansion turbine operatively associated with the main compressor, combustors constructed and arranged to receive compressed air from the main compressor and to feed the main expansion turbine, and an electric generator associated with the main expansion turbine for generating electric power. A compressed air storage stores compressed air. A heat exchanger is constructed and arranged to receive a source of heat and to receive compressed air from the storage so as to heat compressed air received from the storage. An air expander is associated with the heat exchanger and is constructed and arranged to expand the heated compressed air for producing additional electric power. Airflow, extracted from the expander, is injected into the combustion turbine assembly upstream of the combustors, with injected airflow parameters being consistent with flow parameters of the main compressor at the injection point.

In accordance with another aspect of the invention, a method is provided to augment power of a combustion turbine assembly. The combustion turbine assembly includes a main compressor constructed and arranged to receive ambient inlet air, a main expansion turbine operatively associated with the main compressor, combustors constructed and arranged to receive compressed air from the main compressor and to feed the main expansion turbine, and an electric generator associated with the main expansion turbine for generating electric power. The method provides stored compressed air from a compressed air storage. The compressed air originating from the storage is heated. The heated, compressed air is expanded in an air expander for producing additional electric power. Airflow is extracted from the expander and is injected into the combustion turbine assembly upstream of the combustors with injection flow parameters of the injected airflow being consistent with flow parameters of the main compressor at the injection point.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
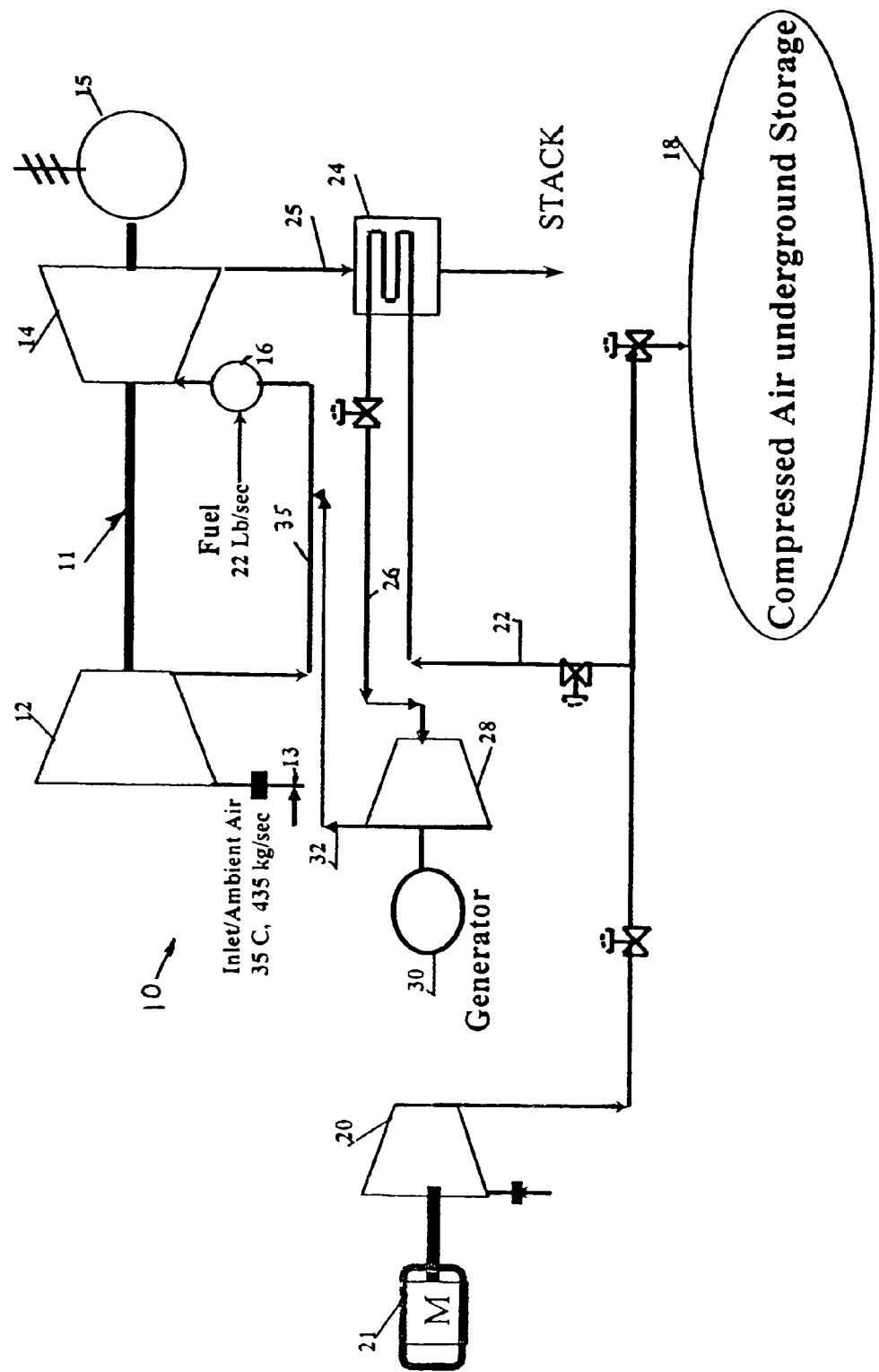
FIG. 1 is a schematic illustration of a combustion turbine power generation system with power augmentation using a compressed air storage supplying compressed air, preheated in a heat exchanger, to an expander that expands the air for providing additional power with expander exhaust airflow being injected upstream of the combustors, provided in accordance with the principles of the present invention.

With reference to FIG. 1, a combustion turbine power generation system with power augmentation, generally indicated as 10, is shown in accordance with an embodiment of the present invention. The system 10 includes a conventional combustion turbine assembly, generally indicated at 11, having a main compressor 12 receiving, at inlet 13, a source of inlet air at ambient temperature and feeding combustors 16 with the compressed air; a main expansion turbine 14 operatively associated with the main compressor 12, with the combustors 16 feeding the main expansion turbine 14, and an electric generator 15 for generating electric power.

A compressed air storage 18 is provided that is preferably an underground storage structure that stores air that is compressed by at least one auxiliary compressor 20. In the embodiment, the auxiliary compressor 20 is driven by a motor 21, but can be driven by an expander or any other source. The auxiliary compressor 20 charges the storage 18 with compressed air during off-peak hours. An outlet 22 of the storage 18 is preferably connected with a heat exchanger 24. The heat exchanger 24 also receives exhaust air 25 from the main expansion turbine 14. Instead, or in addition to the exhaust air 25 from the main turbine 14, the heat exchanger 24 can receive any externally available source of heat.

An outlet 26 of the heat exchanger 24 is connected to an expander 28 that is connected to an electric generator 30. In accordance with the embodiment, during peak hours, compressed air is withdrawn from the storage 18, preheated in the heat exchanger 24 and sent to the expander 28. The heated air is expanded though the expander 28 that is connected to the electric generator 30 and produces additional power. The exhaust from the expander 28, with injection flow parameters determined by combustion turbine limitations and optimization, is injected into the combustion turbine assembly 11 upstream of combustors 16. Thus, as shown in FIG. 1, structure 32 communicates with structure 35 to facilitate the injection of air. In the embodiment, the structures 32 and 35 are preferably piping structures.

Typical gross power augmentation of a combustion turbine associated with an air injection technology is 20-25%. The additional power of the additional expander 28, operating with the injection airflow of approximately 12-14% (of the combustion turbine assembly inlet flow) and utilizing a stored compressed air with the inlet pressure of approximately 60-80 bars (a typical stored compressed air pressure) preheated in the heat exchanger 24 to the inlet temperature of approximately 480-500 C, is approximately 5-10% of the combustion turbine assembly 11 power. As an example, the GE 7241 combustion turbine assembly operating at 35 C could have gross power augmentation of approximately 38-40 MW with the air injection flow of approximately 12% of the combustion turbine assembly inlet flow; the expander 28 additional power is approximately 10 MW with the total power augmentation of approximately 48-50 MW. The power generation system 10 heat rate is reduced because the additional expander 28 power is delivered without any additional fuel flow, i.e. with the zero heat rate.

Figure 2:
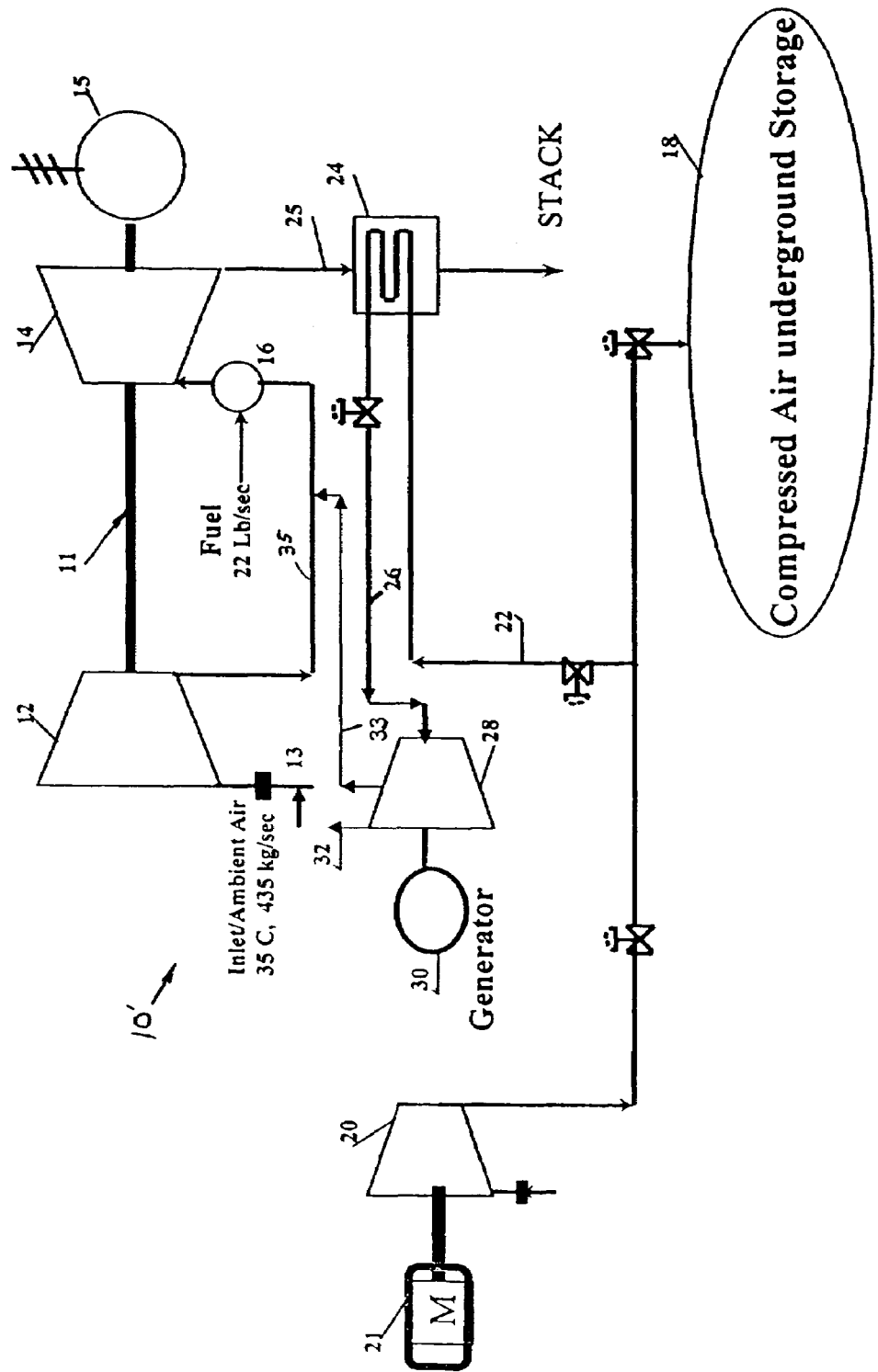
FIG. 2 is a schematic illustration of a combustion turbine power generation system with power augmentation using a compressed air storage supplying compressed air, preheated in a heat exchanger, to an expander that expands the air for providing additional power with airflow extracted from a stage of the expander being injected upstream of the combustors, provided in accordance with the principles of another embodiment of the present invention.

This system 10 has the following additional (to original embodiment with a combustion turbine assembly 11; compressed air storage 18 and charging compressor 20) components:

The additional air expander 28
The heat exchanger 24 recovering the combustion turbine 14 exhaust heat and feeding the expander 28
BOP piping and specialties The overall parameters of the system 10 are optimized based on the overall plant economics including:

Additional components capital and operational costs
The combustion turbine power augmentation
The expander 28 additional peaking power produced FIG. 2 shows another embodiment of the system 10' that is similar to that of FIG. 1, except that the additional expander 28 expands the preheated compressed stored air from the stored air pressure to atmospheric pressure resulting in much higher power. In addition, the expander flow rate is not restricted to the injection rate allowable by a specific combustion turbine assembly. Furthermore, the air required for the injection in a combustion turbine assembly for power augmentation with specific parameters is extracted from the expander 28 with specific parameters.

With reference to FIG. 2, the compressed air from the storage 18 is directed to the heat exchanger 24 that receives heat from the source of a heat (e.g. exhaust of turbine 14). The heated air is expanded though the expander 28 that is connected to the electric generator 30 and produces additional power. The airflow of expander 28 is a subject for optimization and could be as high as a combustion turbine inlet flow. The expander 28 has a provision for an extracted airflow flow with parameters consistent with the requirements of the air injection technology determined by combustion turbine assembly limitations. In other words, the injection flow parameters of the injected airflow are consistent with flow parameters of the main compressor 12 at an injection point. The extracted airflow is injected via structure 33 into the combustion turbine assembly 11 (via structure 35) upstream of the combustors 16 with a combustion turbine power augmentation of approximately 20-25%. The remaining airflow in the expander 28 is expanded though low pressure stages to atmospheric pressure. The additional power of the expander is a subject of optimization and could be equal to a combustion turbine power.

As an example, the GE 7241 combustion turbine operating at 35 C could have gross power augmentation of approximately 38-40 MW with the extracted (from the additional expander 28) and injected airflow of approximately 12% of the combustion turbine inlet flow; the expander additional power could be as high as the combustion turbine power and is a subject for optimization.

The use of the expander 28 can be employed in a Combustion Turbine/Combined Cycle Power Plant. This system preferably includes the following additional (to the combustion turbine assembly 11; compressed air storage 18 and charging compressor 20) components:

The air expander 28,
Heat exchanger 24 recovering the combustion turbine 14 exhaust heat and feeding the expander 28,
BOP piping and specialties The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A combustion turbine power generation system comprising:

a combustion turbine assembly including a main compressor constructed and arranged to receive ambient inlet air, a main expansion turbine operatively associated with the main compressor, combustors constructed and arranged to receive compressed air from the main compressor and to feed the main expansion turbine, and an electric generator associated with the main expansion turbine for generating electric power, a compressed air storage storing compressed air;

a heat exchanger constructed and arranged to receive a source of heat and to receive compressed air from the storage so as to heat compressed air received from the storage, and an air expander associated with the heat exchanger and constructed and arranged to expand the heated compressed air for producing additional electric power, wherein airflow of the expander is extracted from the expander and is injected into the combustion turbine assembly upstream of the combustors, and wherein the airflow extracted and injected is an airflow from a first stage of the expander, with injection flow parameters being consistent with flow parameters of the main compressor at an injection point, with a remaining portion of the it airflow of the expander being expanded through at least one second stage of the expander to atmospheric pressure.

2. The system of claim 1, wherein the heat exchanger is constructed and arranged to receive exhaust from the main expansion turbine thereby defining the source of heat.

3. The system of claim 1, further comprising at least one auxiliary compressor for charging the compressed air storage.

4. The system of claim 1, further including an electric generator associated with the expander for generating the additional electric power.

5. A combustion turbine power generation system comprising:

a combustion turbine assembly including a main compressor constructed and arranged to receive ambient inlet air, a main expansion turbine operatively associated with the main compressor, combustors constructed and arranged to receive compressed air from the main compressor and to feed the main expansion turbine, and an electric generator associated with the main expansion turbine for generating electric power, means for storing compressed air;

means, receiving a source of heat and receiving compressed air from the means for storing, for heating compressed air received from the means for storing, and means, associated with the means for heating, for expanding the heated compressed air for producing additional electric power, wherein airflow of the means for expanding is extracted from the means for expanding and is injected into the combustion turbine assembly upstream of the combustors, and wherein the airflow extracted and injected is an airflow from a first stage of the means for expanding, with injection flow parameters being consistent with flow parameters of the main compressor at an injection point, with a remaining portion of the airflow of the means for expanding being expanded through at least one second stage of the means for expanding to atmospheric pressure.

6. The system of claim 5, wherein the means for heating is a heat exchanger constructed and arranged to receive exhaust from the main expansion turbine thereby defining the source of heat.

7. The system of claim 5, wherein the means for storing is an underground air storage.

8. The system of claim 7, further comprising at least one auxiliary compressor for charging the air storage.

9. The system of claim 5, further including an electric generator associated with the means for expanding for generating the additional electric power.

10. A method augmenting power of a combustion turbine assembly, the combustion turbine assembly including a main compressor constructed and arranged to receive ambient inlet air, a main expansion turbine operatively associated with the main compressor, combustors constructed and arranged to receive compressed air from the main compressor and to feed the main expansion turbine, and an electric generator associated with the main expansion turbine for generating electric power, the method including:

providing stored compressed air from a compressed air storage, heating compressed air originating from the storage.

expanding the heated, compressed air in an air expander for producing additional electric power, and extracting airflow of the expander and injecting the extracted airflow into the combustion turbine assembly upstream of the combustors, wherein the extracted and injected airflow is an airflow from a first stage of the expander, with injection flow parameters being consistent with flow parameters of the main compressor at an injection point, with a remaining portion of the it airflow of the expander being expanded through at least one second stage of the expander to atmospheric pressure.

11. The method of claim 10, wherein the heating step includes using exhaust heat from the main expansion turbine.

12. The method of claim 10, wherein the method includes producing the additional electric power by providing an electric generator coupled with the expander.

13. The system of claim 5, wherein the means for expanding is an air expander.

* * * * *